(12) United States Patent
Futami et al.

(10) Patent No.: US 7,706,649 B2
(45) Date of Patent: Apr. 27, 2010

(54) OPTICAL PROCESSING DEVICE AND OPTICAL PROCESSING METHOD (75) Inventors: Fumio Futami, Kawasaki (JP); Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/261,261

(22) Filed: Oct. 30, 2008

(65) Prior Publication Data

US 2009/0207489 A1 Aug. 20, 2009

(30) Foreign Application Priority Data

Feb. 14, 2008 (JP) ............................. 2008-033228

(51) Int. Cl.
*G02B 6/00* (2006.01)
*G02B 6/35* (2006.01)

(52) U.S. Cl. ........................... 385/122; 385/11; 385/16

(58) Field of Classification Search ................. None
See application file for complete search history.

(56) References Cited

U.S. PATENT DOCUMENTS

| 6,477,287 | B1 * | 11/2002 | Hait | 385/15 |
| 2006/0039642 | A1 | 2/2006 | Arahira | |
| 2006/0051100 | A1 | 3/2006 | Watanabe | |
| 2007/0211252 | A1 * | 9/2007 | Futami et al. | 356/364 |

FOREIGN PATENT DOCUMENTS

JP 2008-89781 4/2008

OTHER PUBLICATIONS

European Search Report issued May 19, 2009 in corresponding European Patent Application 08019426.9.
M. Kagawa, et al., "Optical Add/Drop Multiplexer in Metro/Access Network System", Journal of Furukawa Electric, pp. 56-61, Jan. 2003.
J. H. Lee, et al., "All-Optical 80-Gb/s Add-Drop Multiplexer Using Fiber-Based Nonlinear Optical Loop Mirror", IEEE Photonics Technology Letters, vol. 17, No. 4, pp. 840-842, Apr. 2005.

* cited by examiner

*Primary Examiner*—Omar Rojas
(74) *Attorney, Agent, or Firm*—Fujitsu Patent Center (57) ABSTRACT An optical processing device includes: a light source that outputs second light having a first polarization state or a second polarization state in synchronization with the pulse timing of the pulse of first light; a first nonlinear medium that controls the polarization state of the first light pulse in accordance with the polarization state of the second light pulse, using a nonlinear effect; and a separator that outputs the first light pulse from the first nonlinear medium selectively to a first output path or a second output path in accordance with the polarization state controlled by the first nonlinear medium. In this device, the first nonlinear medium uses the nonlinear effect to compensate the level of each first light pulse output selectively to the first output path or the second output path by the separator, with each first light pulse receiving the energy of the second light pulse.

12 Claims, 3 Drawing Sheets

OPTICAL PROCESSING DEVICE AND OPTICAL PROCESSING METHOD

CROSS-REFERENCE TO RELATED APPLICATION(S)

This application is based upon and claims the benefit of priority of the prior Japanese Application No. 2008-033228, filed on Feb. 14, 2008 in Japan, the entire contents of which are hereby incorporated by reference.

FIELD

The present invention relates to a device and method for performing signal processing on light in an optical diverging insertion device that divides optical signals used in optical communications and the likes in a time domain.

BACKGROUND

Optical fiber communications have developed into ring-type structures and are further developing into mesh-type structures by the wavelength division multiplexing (WDM) technique utilizing the characteristics of optical fiber communications, having started from a system that connects two points with large capacity. In a photonic network having optical fibers connected in a mesh-like manner, each node having optical fibers connected thereto preferably has the function to direct signals to different destinations.

After an optical signal is converted to an electric signal, the electric signal is converted back to an optical signal based on the destination to which the electric signal is directed, and the optical signal is transmitted to the next node. This is a stable technique, but gives rise to enlargements of device size, power consumption, and the like. In view of the above, there has been provided an optical ADM (Add/Drop Multiplexer) that can switch wavelength paths by diverging or inserting optical signals of certain wavelength (see "Optical Add/Drop Multiplexer in Metro/Access Network System" by Masayoshi Kagawa, et al., Journal of the Furukawa Electric Co., Ltd. January 2003).

A ROADM (Reconfigurable Optical Add/Drop Multiplexer) that can diverge or insert optical signals of desired wavelength has the advantages that optical paths can be arbitrarily set by remote control, and a photonic network that does not depend on bit rates can be constructed. With such a ROADM, a network operation becomes easier, and more flexible construction of photonic networks is realized.

However, a ROADM does not have the function to input and output optical signals of the same wavelength at high speed in a time domain, though being flexible in inputting and outputting wavelengths of optical signals. To realize a photonic network with higher granularity in the future, it is preferable to develop an optical switching technique by which optical signals can be arbitrarily input and output at high speed in a time domain. Therefore, intensive studies are being made on switches for inputting and outputting optical signals at high speed in a time domain.

A technique for switching optical signal paths in a time domain is disclosed in "All-Optical 80-Gb/s Add-Drop Multiplexer Using Fiber-Based Nonlinear Optical Loop Mirror" (by Ju Han Lee, et al., IEEE PHOTONICS TECHNOLOGY LETTERS, VOL. 17, NO. 4, April 2005 (hereinafter referred to as Reference 2)). According to this technique, with the use of an optical switch using an interferometer called NOLM (Nonlinear loop mirror) formed with optical fibers, optical signal paths are switched on the time axis by an interference action using control light. The NOLM is a high-speed and wide-band device, using a nonlinear effect of the optical fibers. Unlike regular optical fibers for transmitting optical signals, nonlinear fibers having a high nonlinear effect can form a small-sized structure. Also, electricity is not applied in the NOLM.

The technique disclosed in Reference 2 can be clearly distinguished from techniques using electronic circuits. However, it is difficult to maintain stable operations of the interferometer switch using the interference of light in the NOLM, and it is also difficult to increase the switching efficiency due to insertion loss of an optical component or the like. As a result, the optical signal quality is degraded. In a future photonic network that is expected to have a number of nodes for an optical signal to pass through, it is preferable to achieve higher switching efficiency.

SUMMARY

Therefore, an object of the present embodiment(s) is to increase the switching efficiency in an optical switching operation for switching the output paths of optical signals in a time domain, and avoid degradation of optical signal quality due to switch loss or the like.

Another object of the present embodiment(s) is to perform stable optical switching operations for diverging and inserting optical signals in a time domain.

Therefore, an optical processing device includes: a light source that outputs second light having a first polarization state or a second polarization state in synchronization with the pulse timing of the pulse of first light, the second polarization state being different from the first polarization state; a first nonlinear medium that receives the first light pulse and a second light pulse from the light source, and controls the polarization state of the first light pulse in accordance with the polarization state of the second light pulse, using a nonlinear effect; and a separator that outputs the first light pulse from the first nonlinear medium selectively to a first output path or a second output path in accordance with the polarization state controlled by the first nonlinear medium. In this device, the first nonlinear medium uses the nonlinear effect to compensate the level of each first light pulse output selectively to the first output path or the second output path by the separator, with each first light pulse receiving the energy of the second light pulse.

An optical processing method includes: outputting second light having a first polarization state or a second polarization state in synchronization with the pulse timing of the pulse of first light, the second polarization state being different from the first polarization state; inputting the first light pulse and the second light to a first nonlinear medium, and controlling the polarization state of the first light pulse in accordance with the polarization state of the second light, using a nonlinear effect at the first nonlinear medium; and outputting the first light pulse from the first nonlinear medium selectively to a first output path or a second output path in accordance with the polarization state controlled by the first nonlinear medium. By this method, the level of the selectively output first light pulse is compensated by receiving the energy of the second light by virtue of the nonlinear effect at the first nonlinear medium.

Additional objects and advantages of the invention (embodiment) will be set forth in part in the description which follows, and in part will be obvious from the description, or may be learned by practice of the invention. The object and

DESCRIPTION OF THE PREFERRED EMBODIMENTS

The following is a description of embodiments of the present invention, with reference to the accompanying drawings.

[A] Description of First Embodiment

Figure 1:
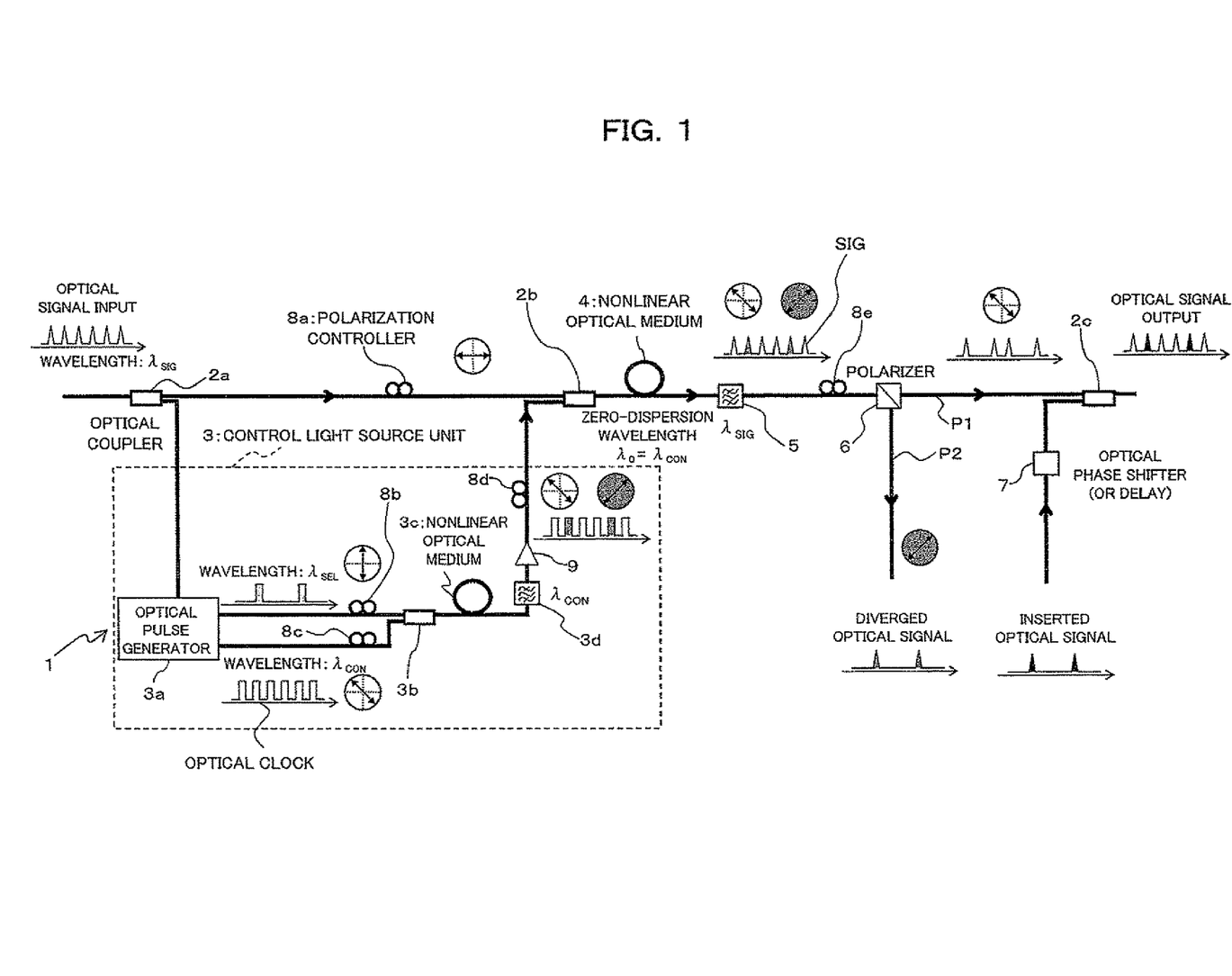
FIG. 1 illustrates an optical processing device in accordance with a first embodiment.

FIG. 1 illustrates an optical processing device in accordance with a first embodiment. The optical processing device 1 illustrated in FIG. 1 includes optical couplers 2a through 2c, a control light source unit (the light source) 3, a nonlinear medium (the first nonlinear medium) 4, a wavelength filter 5, a polarizer 6, and an optical phase shifter 7. The optical processing device can switch output paths on a bit-time basis, with respect to an optical signal of wavelength λSIG to be input. In this embodiment, the optical signal to be input is described as a RZ intensity-modulated pulse, but an optical signal modulated by some other method may also be used.

The optical coupler 2a outputs a part of the input optical signal (the first light) to the control light source unit 3, and outputs the rest of the optical signal to the optical coupler 2b connected to the nonlinear medium 4. To adjust the polarization state of the optical signal output to the optical coupler 2b in relation to the polarization state of control light supplied from the control light source unit 3, a polarization controller (the first polarization controller) 8a may be provided.

The control light source unit 3 is a control light source that outputs a control light (the second light) pulse that is substantially synchronized with the optical signal pulse. And the control pulse has a light pulse in a first polarization state or a second polarization state different from the first polarization state in accordance with the pulse timing of the optical signal pulse. In this embodiment, the control light source unit 3 outputs a clock pulse (λCON in optical wavelength) having light pulses in one of the first and second polarization states that are perpendicular to one another and are arranged on a time axis, respectively. The clock pulse is used as a control light pulse at the nonlinear medium 4 in the later stage to control the polarization state of the input optical signal based on an optical parametric effect as a third-order nonlinear optical effect.

The control light source unit 3 includes an optical pulse generator 3a, an optical coupler 3b, a nonlinear medium (the second nonlinear medium) 3c, and a wavelength filter 3d. The optical pulse generator 3a outputs an optical clock of the wavelength λCON substantially synchronized with clock components extracted from the optical signal from the optical coupler 2a. The optical pulse generator 3a also outputs a light pulse of wavelength λSEL that is different from λCON. The light pulse λSEL is polarization-state selecting light. The light pulse λSEL forms an extinction state in a time domain where the polarization state of the control light pulse output from the control light source unit 3 itself should be put into a certain polarization state, and also forms a rising state in a time domain where the polarization state of the control light pulse should be put into another polarization state.

More specifically, the optical pulse generator 3a is a clock light source that outputs an optical clock substantially synchronized with the optical signal pulse. The optical pulse generator 3a is also a polarization-state selecting light source that outputs the polarization-state selecting light having each pulse rise in synchronization with the pulse timing of the control light pulse in either one of the first and second polarization states among the clock pulses forming the optical clock.

For example, the polarization-state selecting light λSEL illustrated in FIG. 1 is in a rising state in synchronization with the pulse timing of the clock pulses that are second and fifth clock pulses (from the right-hand side) of the clock pulses forming the optical clock. The polarization-state selecting light λSEL is in an extinction state in synchronization with the pulse timing of the other clock pulses.

The optical coupler 3b combines the optical clock and the polarization-state selecting light λSEL from the optical pulse generator 3a in polarization states having different polarization angles from each other by approximately 45 degrees. In the example illustrated in FIG. 1, the combined light has a polarization angle of −45 degrees with respect to the optical clock to be input to the nonlinear medium 3c, and has a polarization approximately vertical with respect to the polarization-state selecting light λSEL. In this case, the optical pulse generator 3a can output a control light pulse forming the optical clock and the polarization-state selecting light λSEL having such a relationship in polarization direction with respect to each other.

In a case where the optical clock and the polarization-state selecting light λSEL output from the optical pulse generator 3a do not have the above polarization-direction relationship, or where the polarization angles are to be adjusted, polarization controllers 8b and 8c for adjusting the polarization states of the optical clock and the polarization-state selecting light λSEL may be provided on the optical paths between the optical pulse generator 3a and the optical coupler 3b, if necessary.

The nonlinear medium (the second nonlinear medium) 3c receives the optical clock and the polarization-state selecting light λSEL from the optical pulse generator 3a via the optical coupler 3b, and generates a clock pulse string (of the optical wavelength λCON) through polarization rotation caused by an optical Kerr effect, for example. In the clock pulse string, light pulses of the first and second polarization states perpendicular to each other are arranged on the time axis.

"Nonlinear fiber optics, 4th edition, Academic press, 2007" discloses the principles of polarization rotation. When the first light (equivalent to the optical clock) of linear polarization and the second light (equivalent to the polarization-state selecting light λSEL) having a polarization direction at 45 degrees with respect to the polarization direction of the first light are input to the nonlinear medium 3c, the polarization state of the second light overlapping the first light in terms of time changes due to the cross phase modulation (XPM) caused by the first light.

In the example case illustrated in FIG. 1, the time domain where the polarization-state selecting light λSEL to be input to the nonlinear medium 3c is in an extinction state (the rising time domain of the first, third, fourth, and sixth clock pulses of the optical clock seen from the right-hand side) does not overlap the optical clock in terms of time. Accordingly, the polarization state of the optical clock does not rotate, and the optical clock in this time domain is output while maintaining the same polarization state as that of the input time (the polarization state having a polarization angle of −45 degrees). Meanwhile, the time domain where the polarization-state selecting light λSEL is in a rising state (the rising time domain of the second and fifth clock pulses of the optical clock seen from the right-hand side) overlaps the optical clock in terms of time. Accordingly, the polarization state of the optical clock in this time domain rotates, and the optical clock in a polarization state having a polarization angle of approximately 45 degrees is output as a result.

If a nonlinear phase shift obtained by doubling the product of the nonlinear coefficient of the nonlinear medium 3c, the interaction length of the nonlinear medium 3c, and the intensity of the first light is in the neighborhood of π, the polarization state becomes substantially perpendicular to the polarization state observed before the change. In other words, the nonlinear coefficient and the interaction length of the nonlinear medium 3c, and the intensity of the optical clock to be input to the nonlinear medium 3c are set so that the polarization angle of the optical clock (having a polarization state of approximately 45 degrees) output from the nonlinear medium 3c in the time domain having the polarization rotation is substantially at a right angle with respect to the optical clock (having a polarization state of approximately −45 degrees) in the time domain that has ceased polarization rotation.

The optical filter 3d removes the wavelength components (λSEL) of the polarization-state selecting light from the light output from the nonlinear medium 3c, and lets the components of the optical clock wavelength (λCON) pass as the above described control light pulse. The control light pulse is output to the nonlinear medium 4 via the optical coupler 2b. As opposed to the polarization controller 8a provided for adjusting the polarization state of the input optical signal, a polarization controller (the second polarization controller) 8d may be further provided. The polarization controller 8d controls the control light pulse to have a desired polarization state.

The nonlinear medium 3c may be realized with the use of a step index optical fiber, a nonlinear optical fiber that is a holey fiber having cavities in its cross section and has a nonlinear coefficient improved with an increase in nonlinear refractive index through a reduction of the core cross-sectional area or an addition of germanium or the like, a nonlinear optical fiber that has a main component with an extremely high nonlinear refractive index such as chalcogenide, or a photonic crystal fiber that has a coefficient improved by enclosing light by virtue of a bandgap effect.

With the above arrangement, the optical signal that inputs to the nonlinear medium 4 through the optical coupler 2b is in an approximately horizontal linear polarization state as illustrated in FIG. 1, for example. Meanwhile, the control light pulse forms a pulse string having light pulses arranged on the time axis. Each of the light pulses has one of two polarization states (one of the first and second polarization states). The two polarization states are polarization angles of −45 degrees and 45 degrees with respect to the horizontal direction, and are perpendicular to each other.

The nonlinear medium (the first nonlinear medium) 4 receives the above optical signal pulse and the control light pulse. Using an optical parametric effect as a third-order nonlinear optical effect, the nonlinear medium 4 controls the polarization state of the optical signal in accordance with the polarization state of the control light pulse. As the optical signal pulses receive the energy of the control light pulse, the optical signal is amplified.

As the nonlinear medium 4 controls the polarization state of the optical signal by virtue of a nonlinear optical effect, the polarizer 6 in the later stage can divide the input optical signal pulses into different output paths. In other words, the control light pulse from the control light source unit 3 has a polarization state that is perpendicular to the optical signal to be divided into the output paths at the polarizer 6 in the later stage.

In the nonlinear medium 4, the operation to increase the amplitude while controlling the polarization state is based on a third-order nonlinear optical effect such as an optical parametric effect. When high-power control light λCON that is linearly polarized in an approximately 45-degree direction with respect to the polarization direction of linearly-polarized optical signal pulses (the horizontal direction as indicated by λSIG in FIG. 1) is input, the polarization direction of the optical signal rotates approximately 45 degrees, and the amplitude is increased at the same time. When high-power control light λCON that is linearly polarized in a −45-degree direction is input, the polarization direction of the optical signal rotates −45 degrees, and the amplitude is increased at the same time.

As described above, in the control light source unit 3, a control light pulse that is synchronized with the input optical signal pulse and has the first or second polarization state is generated in accordance with the output path to be set for each light pulse in the optical signal pulse string. Accordingly, the optical signal pulse to be input to the nonlinear medium 4 has a polarization state controlled so as to conform to the polarization state of the control light pulse in each time domain. In a time domain where a control light pulse in the first polarization state (in the polarization direction of approximately −45 degrees) is input, the optical signal pulse that is output from the nonlinear medium 4 is controlled to have a linear polarization state of −45 degrees. In a time domain where a control light pulse in the second polarization state (in the polarization direction of approximately 45 degrees) is input, the optical signal pulse is controlled to have a linear polarization state of 45 degrees.

The above described polarization state control by an optical parametric effect and the optical amplification are disclosed in detail in Japanese Patent No. 3,920,297, for example. The nonlinear medium 4 has λCON as the zero-dispersion wavelength λ0. The nonlinear medium 4 may be a step index optical fiber, a nonlinear optical fiber that is a holey fiber having cavities in its cross section and has a nonlinear coefficient improved with an increase in nonlinear refractive index through a reduction of the core cross-sectional area or an addition of germanium or the like, a nonlinear optical fiber that has a main component with an extremely high nonlinear refractive index such as chalcogenide, a photonic crystal fiber that has a coefficient improved by enclosing light by virtue of a bandgap effect, or a nonlinear waveguide utilizing a silicon photonics technique, or the like. However, the nonlinear medium 4 is not limited to those materials.

The optical filter 5 transmits the wavelength components (λSIG) of optical signal pulses of the light output from the nonlinear medium 4, and also removes the components other than the wavelength components of the optical signal pulses such as the wavelength components (λCON) of the control light pulse. The optical filter 5 then outputs the remaining components to the polarizer 6. The optical filter 5 may be a filter formed by depositing a dielectric multi-layer film or may be an optical fiber Bragg grating having a periodic structure at the core of an optical fiber, for example. However, the optical filter 5 is not limited to those structures.

The polarizer 6 is a separator that outputs optical signal pulse from the nonlinear medium 4 selectively to a first output path or a second output path in accordance with the polarization state controlled by the nonlinear medium 4. More specifically, each optical signal pulse controlled to have the linear polarization state of 45 degrees by the nonlinear medium 4 is output to the first output path P1. Each optical signal pulse controlled to have the linear polarization state of 45 degrees by the nonlinear medium 4 is output to the second output path P2.

The polarizer 6 may be formed with a polarization prism having a prism pair bonded thereto, so that polarized components perpendicular to each other can be simultaneously output to different output paths, for example.

As described above, in the nonlinear medium 4, the polarization state of input optical signal (horizontal-direction linear polarization) is controlled, so that the light pulses to be output through the first output path P1 (the first, third, fourth, and sixth light pulses from the right-hand side in FIG. 1) of the optical signal pulse string SIG to be output from the optical filter 5 are controlled to have the polarization angle of −45 degrees, while the light pulses to be output through the second output path P2 (the second and fifth light pulses from the right-hand side in FIG. 1) are controlled to have the polarization angle of 45 degrees, as illustrated in FIG. 7.

In the polarizer 6, the polarization state of each optical signal pulse can be controlled by the control light pulse output from the control light source unit 3. Accordingly, the polarizer 6 can be designed as an optical switch that switches the output path between the first output path P1 and the second output path P2 for each pulse of the optical signal pulse string that is input through one input port. If the first output path is set as a through port, and the second output path is set as a drop port, the light pulses to be separately output from the second output path P2 as the drop port can be selected from the optical signal pulses by the control light pulse.

In the nonlinear medium 4, the optical signal amplifying effect can be provided as well as the polarization state control for controlling the switching of the output paths. Accordingly, the switching efficiency that is the ratio in intensity between the input optical signal and the optical signal obtained after the output path switching can be improved (can be made 1 or higher, for example). Thus, the switching efficiency determined by the ratio between the input signal intensity and the output signal intensity can be made much higher than the switching efficiency in a conventional case.

To achieve the above described optical signal amplifying effect of the nonlinear medium 4, the control light is required to have relatively high intensity. Therefore, as illustrated in FIG. 1, the control light source unit 3 may further include an optical amplifier 9 that increases the amplitude of the control light pulse output from the nonlinear medium 3c. In the example illustrated in FIG. 1, the optical amplifier 9 is provided between the optical filter 3d and the polarization controller 8d.

In the nonlinear medium 4, the switching efficiency is set at 1 or higher by the optical signal amplifying effect. However, the switching efficiency may be lower than 1 relative to the first light pulse, as long as the level of each first light pulse that is output to the first output path P1 or the second output path P2 by the polarizer 6 using a nonlinear effect can be compensated by receiving the energy of the second light.

The optical phase shifter 7 delays and adjusts the insertion timing of light pulses to be inserted through the downstream optical transmission path to the empty pulse positions on the time axis in synchronization with the timing for not outputting light pulses from the polarizer 6 through the first output path P1. The light pulses having the insertion timing adjusted by the optical phase shifter 7 are combined with the optical signal output from the polarizer 6 through the first output path P1 by the optical coupler 2c. In this manner, light pulses from the optical phase shifter 7 are inserted in the empty timing positions in the optical pulse string, and are output to the downstream optical transmission path.

The optical phase shifter 7 and the optical coupler 2c form a pulse inserting unit that inserts light pulses to the optical signal pulses output through the first output path P1, in synchronization with the optical signal pulses separated by the polarizer 6 and output through the second output path P2.

As described above, in the optical processing device 1 of the first embodiment, the control light source unit 3 outputs a control light pulse that is substantially in synchronization with the input optical signal pulse, and has light pulses in the first polarization state or the second polarization state different from the first polarization state. The control light source unit 3 outputs the control light pulse in synchronization with the pulse timing of the optical signal pulse. The control light pulse is a linearly-polarized optical clock that has polarization states perpendicular to each other, like the signal (optical signal pulse) to pass through the polarizer 6 or to be diverged at the polarizer 6 in the later stage.

The optical signal pulse and the control light pulse in synchronization with each other are input to the nonlinear medium 4. At this point, the polarization states of the linearly-polarized optical signal and control light are adjusted at approximately 45 degrees (or approximately −45 degrees) with respect to each other. With this arrangement, the polarization state of the optical signal pulse can be controlled in accordance with the polarization state of the control light pulse by virtue of the nonlinear effect at the nonlinear medium 4. Because of the high intensity of the control light pulse, the polarization directions of the diverged signal directed to the second output path P2 and the non-diverged signal directed to the first output path P1 become approximately perpendicular to each other. In other words, optical signals linearly-polarized in the horizontal direction rotate approximately 45 degrees and approximately −45 degrees, respectively. At the same time, the energy of the control light is transferred to the optical signal, so as to increase the amplitude of the optical signal.

After the control light is removed by the optical filter 5 located on the output side of the nonlinear medium 4, the diverged optical signal and the non-diverged optical signal perpendicular to each other are separated from each other by the polarizer 6. If necessary, an insertion optical signal can be input to the empty time domains in the non-diverged optical signal through the optical phase shifter 7 and the optical coupler 2c.

As described above, in accordance with the first embodiment, the nonlinear medium 4 can transfer the energy of the control light to the optical signal. Accordingly, the intensity of the optical signal after the switching of the output paths can be made higher than the intensity of the optical signal observed at the time of the input, unlike the intensity of an optical signal that becomes lower due to insertion loss of an optical component or the like at a conventional optical switch. Thus, high optical signal quality can be maintained by increasing the switching efficiency to 1 or more. Furthermore, it is possible to realize a high-speed switch that is not limited by the number of optical divergence insertion nodes the optical signal passes through and is unbounded by the restrictions on the electronic-circuit operation speed. Thus, the construction of a photonic network with high flexibility and operability can be sped up.

Since a nonlinear effect is used in the optical domains, more stable optical switching (the switching of the output paths) can be performed, compared with the switching characteristics of a conventional case that are affected by the optical interference conditions and the likes.

Furthermore, the control light that has the polarization state corresponding to an output path as a switching destination of the polarizer 6 for each pulse is generated, so that the output paths can be switched based on the pulse width of the control light. Thus, high-speed switching with much smaller switching periods can be performed.

[B] Description of Second Embodiment

Figure 2:
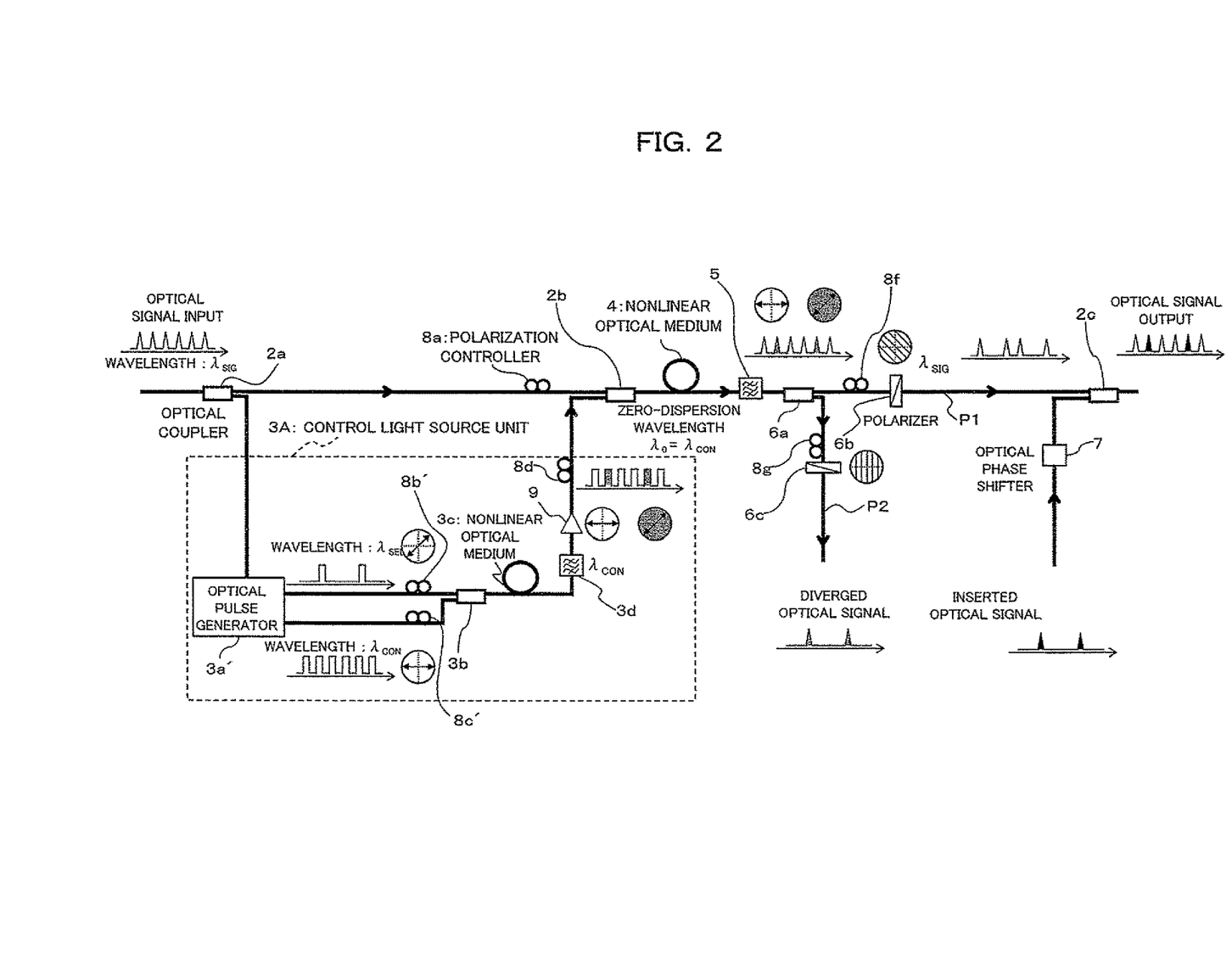
FIG. 2 illustrates an optical processing device in accordance with a second embodiment.

FIG. 2 illustrates an optical processing device 1A in accordance with a second embodiment. The optical processing device 1A illustrated in FIG. 2 differs from the optical processing device of the first embodiment in a control light pulse to be output from a control light source unit 3A, and a separator that divides the optical signal output from the nonlinear medium 4 into components to be output to the first and second output paths. However, the other aspects of this embodiment are the same as those of the first embodiment. In FIG. 2, the same reference numerals as those in FIG. 1 denote approximately the same components as those illustrated in FIG. 1.

In the control light source unit 3 illustrated in FIG. 1, the polarization states of light pulses of an input optical signal as a horizontal-direction linearly-polarized signal to be output to the first and second output paths P1 and P2 are rotated at the nonlinear medium 4. On the other hand, the control light source unit 3A illustrated in FIG. 2 outputs a control light pulse having such a polarization state that the polarization state of a light pulse to be output to the second output path P2 is rotated at the nonlinear medium 4, but the polarization state of a light pulse to be output to the first output path P1 is not rotated.

Of the control light from the control light source unit 3A, the control light pulse corresponding to an optical signal pulse to be output to the first output path P1 has approximately the same horizontal linear polarization as the optical signal pulse, but the control light pulse corresponding to an optical signal pulse to be output to the second output path P2 has linear polarization tilted approximately 45 degrees. In short, the polarization state of the control light corresponding to the optical signal to be diverged to the second output path P2 is a linear polarization state, and is at approximately 45 degrees with respect to the polarization direction of the linear polarization of the control light corresponding to the non-diverged optical signal.

Therefore, the optical pulse generator 3a' of the control light source unit HA is a clock light source and is a polarization-state selecting light source like the optical pulse generator 3a illustrated in FIG. 1, but differs from the optical pulse generator 3a in the polarization states of the optical clock λCON and the polarization-state selecting light λSEL at the stage on the input side of the optical coupler 3b. More specifically, the optical clock to be input to the optical coupler 3b illustrated in FIG. 2 has approximately horizontal linear polarization like the above described optical signal, and the control light pulse forming the polarization-state selecting light λSEL has linear polarization of a polarization angle of approximately 45 degrees relative to the optical clock. In this case, the optical pulse generator 3a' can output the optical clock and the control light pulse forming the polarization-state selecting light λSEL having the above polarization-direction relationship.

In a case where the polarization states of the optical clock and the polarization-state selecting light λSEL output from the optical pulse generator 3a' do not have the above relationship, or where the polarization angles of the light are to be adjusted, polarization controllers 8b' and 8c' adjusting the polarization states of the optical clock and the polarization-state selecting light λSEL may be provided on the optical paths between the optical pulse generator 3a' and the optical coupler 3b, if necessary.

The nonlinear medium (the second nonlinear medium) 3c receives the optical clock and the polarization-state selecting light λSEL from the optical pulse generator 3a' via the optical coupler 3b, and outputs the optical clock and the polarization-state selecting light λSEL in the following manner, using polarization rotation caused by an optical Kerr effect, for example. When the polarization-state selecting light λSEL is in a rising state, the polarization state of the light pulses forming the optical clock λCON rotates to have linear polarization at an inclination angle of 45 degrees (the second polarization state). When the polarization-state selecting light λSEL is in an extinction state, the polarization state of the light pulses of the optical clock λCON remains unchanged (the first polarization state).

As described above, the control light source unit 3a' can output a control light pulse that is in synchronization with the optical signal, and has light pulses arranged on the time axis. The light pulses of the control light pulse include light pulses in the approximately horizontal linear polarization state, which is the first polarization state, and light pulses having the linear polarization rotated approximately 45 degrees, which is the second polarization state.

Of the optical signal to be input to the nonlinear medium 4, the optical signal pulse to be input in synchronization with the control light pulse in the first polarization state is not subjected to the polarization rotation by an optical parametric effect or the like. However, the optical signal pulse receives the energy of the control light pulse. Accordingly, the optical signal pulse to be output can be amplified (or the level of the optical signal pulses is compensated). Meanwhile, the optical signal pulse to be input in synchronization with the control light pulse in the second polarization state is subjected to the polarization rotation by an optical parametric effect or the like, as in the case of the first embodiment. Thus, the optical signal pulse to be output can be amplified.

Further, a diverging unit 6a and first and second polarizers 6b and 6c are provided as a structure serving as a separator that outputs the optical signal pulse from the nonlinear medium 4 via the optical filter 5 selectively to the first output path P1 or the second output path P2 in accordance with the polarization state controlled by the nonlinear medium 4.

The diverging unit (the divider) 6a divides the optical signal pulse from the nonlinear medium 4 into two portions. As for one of the two portions divided by the diverging unit 6a, the first polarizer 6b allows the optical signal pulse component having the first polarization state to pass, but shuts off the optical signal pulse component having the second polarization state. As for the other one of the two portions divided by the diverging unit 6a, the second polarizer 6c allows the optical signal pulse component having the second polarization state to pass, but shuts off the optical signal pulse component having the first polarization state.

In this case, the polarization direction of the optical signal pulse to be guided to the second output path P2 from the optical filter 5 is a 45-degree polarization direction. Therefore, the first polarizer 6b has its transmission face adjusted so that the transmission direction becomes perpendicular to the 45-degree polarization direction, and the light polarized in the approximately −45-degree polarization direction is transmitted. Meanwhile, the polarization direction of optical signal pulse to be guided to the first output path P1 from the optical filter 5 is the horizontal direction. Therefore, the first polarizer 6b has the transmission face adjusted in the same manner as above, so that the corresponding polarization-direction component of the optical signal pulse can be transmitted from the first polarizer 6b.

Also, the polarization direction of the optical signal pulse to be guided to the first output path P1 from the optical filter 5 is the horizontal direction. Therefore, the second polarizer 6c has its transmission face adjusted so that the transmission direction becomes perpendicular to the horizontal direction, and the light polarized in the approximately vertical direction is transmitted. Meanwhile, the polarization direction of optical signal pulse to be guided to the second output path P2 from the optical filter 5 is a 45-degree polarization direction. Therefore, the second polarizer 6c has the transmission face adjusted in the same manner as above, so that the corresponding polarization-direction component of the optical signal pulse can be transmitted from the second polarizer 6c.

With this arrangement, the optical signal pulse transmitted through the first polarizer 6b can be set as the light pulse to be output through the first output path P1, and the optical signal pulse transmitted through the second polarizer 6c can be set as the light pulse to be output through the second output path P2. In this case, polarization controllers 8f and 8g are provided in the stage on the input side of the polarizers 6b and 6c, so that the extinction ratio between the diverged optical signal and the non-diverged optical signal can be set at a high value.

In the optical processing device 1A of the second embodiment having the above structure, the first light as an optical signal and the second light as the control light are input to the nonlinear medium 4. At this point, the polarization states of the first light and the second light are substantially the same linear polarization states in a case of non-divergence (guided to the first output path P1), but the first light and the second light have linear polarization states at 45 degrees with respect to each other in a case of divergence (guided to the second output path P2).

The polarization of the optical signal is rotated to have the second polarization state in the nonlinear medium 4, and the amplitude of the optical signal is increased. In the example illustrated in FIG. 2, the non-diverged optical signal has the same polarization state as the control light. Therefore, the non-diverged optical signal has amplitude three times as high as the amplitude of the diverged optical signal.

The optical signal having the control light wavelength removed by the optical filter 5 is divided into two portions by the diverging unit 6a. The transmission faces of the first polarizer 6b and the second polarizer 6c are adjusted so that the first polarizer 6b does not allow the diverged optical signal to pass, and the second polarizer 6c does not allow the non-diverged optical signal to pass. In this manner, the optical signal can be divided.

As described above, the second embodiment can achieve the same effects as those of the first embodiment.

[C] Modifications

Various changes and modifications can be made of the above described embodiments.

Figure 3:
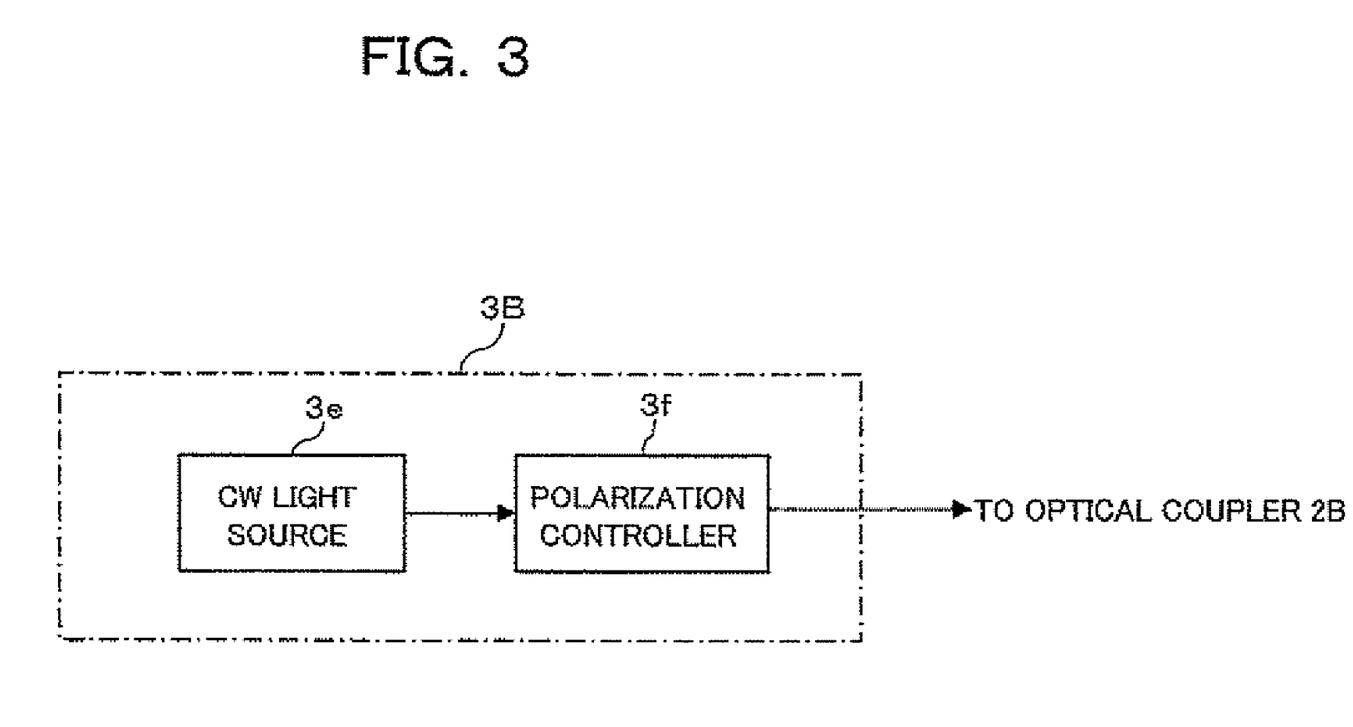
FIG. 3 illustrates a control light source unit in accordance with a modification.

For example, like a control light source unit 3B illustrated in FIG. 3, the control light source unit may include a CW (Continuous Wave) light source 3e that outputs continuous light, and a polarization controller 3f that performs polarization control so that the continuous light from the CW light source 3e has a first polarization state or a second polarization state different from the first polarization state (having a 90-degree polarization angle difference, for example). More specifically, at the polarization controller 3f, the input continuous light is controlled to have the first polarization state in synchronization with the optical signal pulse to be guided to the first output path, and to have the second polarization state in synchronization with the optical signal pulse to be guided to the second output path. In this manner, the control light source units 3 and 3A illustrated in FIGS. 1 and 2 can be replaced with the control light source unit 3B. Although this structure restricts the switch response speed to the electronic-circuit operation speed, stable control light can be supplied.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. An optical processing device comprising:
a light source that outputs a pulse of second light having a first polarization state or a second polarization state in synchronization with pulse timing of a pulse of first light, the second polarization state being different from the first polarization state;
a first nonlinear medium that receives the first light pulse and the second light pulse from the light source, and controls a polarization state of the first light pulse in accordance with a polarization state of the second light pulse, using a nonlinear effect; and
a separator that outputs the first light pulse from the first nonlinear medium selectively to a first output path or a second output path in accordance with the polarization state controlled by the first nonlinear medium, wherein
the first nonlinear medium uses the nonlinear effect to compensate a level of each first light pulse output selectively to the first output path or the second output path by the separator, the level of each first light pulse receiving energy of the second light pulse, and
the light source comprises:
a clock light source that outputs an optical clock that is substantially in synchronization with the first light pulse;
a polarization-state selecting light source that outputs polarization-state selecting light having a pulse rise in synchronization with pulse timing for selecting one of the first and second polarization states among clock pulses of the optical clock; and
a second nonlinear medium that receives the optical clock from the clock light source and the polarization-state selecting light from the polarization-state selecting light source, and outputs an optical clock as the second light pulse having a clock pulse of one of the first and second polarization states, using a nonlinear effect.

2. The optical processing device according to claim 1, wherein the first and second polarization states are two linear polarization states that are approximately perpendicular to each other.

3. The optical processing device according to claim 2, wherein the separator is formed with a polarizer, outputs a first light pulse component controlled to have the first polarization state by the first nonlinear medium to the first output path, and outputs a first light pulse component controlled to have the second polarization state to the second output path.

4. The optical processing device according to claim 1, wherein the first and second polarization states are two linear polarization states that are at approximately 45 degrees with respect to each other.

5. The optical processing device according to claim 4, wherein the separator includes:
a divider that divides the first light pulse from the first nonlinear medium into two;
a first polarizer that allows a first light pulse component having the first polarization state to pass, and shuts off a first light pulse component having the second polarization state, the first light pulse components being of one of the divided portions of the first light pulse; and
a second polarizer that allows a first light pulse component having the second polarization state to pass, and shuts off a first light pulse component having the first polarization state, the first light pulse components being of the other one of the divided portions of the first light pulse.

6. The optical processing device according to claim 1, further comprising:
a first polarization controller that adjusts and controls the polarization state of the first light pulse to be input to the first nonlinear medium, wherein the light source comprises
a second polarization controller that adjusts and controls the polarization state of the second light pulse to be input to the first nonlinear medium.

7. The optical processing device according to claim 1, wherein an optical amplifier that increases amplitude of the second light pulse to be input to the first nonlinear medium is provided between the light source and the first nonlinear medium.

8. The optical processing device according to claim 1, comprising an optical phase shifter that adjusts the pulse timing of the second light pulse to be input to the first nonlinear medium.

9. The optical processing device according to claim 1, comprising a pulse inserting unit that inserts an optical pulse to the first light pulse from the first output path in synchronization with the timing of the first light pulse from the second output path.

10. The optical processing device according to claim 1, wherein the first nonlinear medium is formed with a step index optical fiber, a nonlinear optical fiber that is a holey fiber having cavities in a cross section thereof and has a nonlinear coefficient improved with an increase in nonlinear refractive index through a reduction of the core cross-sectional area or an addition of impurity, a nonlinear optical fiber that has a coefficient improved by having a main component with an extremely high nonlinear refractive index, a photonic crystal fiber that has a coefficient improved by enclosing light by a bandgap effect, or a nonlinear waveguide utilizing a silicon photonics technique.

11. The optical signal processing device according to claim 1, wherein the first light is an optical signal, and the second light is control light.

12. An optical processing method, comprising:
outputting a second light pulse having a first polarization state or a second polarization state in synchronization with pulse timing of a pulse of first light, the second polarization state being different from the first polarization state;
inputting the first light pulse and the second light pulse to a first nonlinear medium, and controlling a polarization state of the first light pulse in accordance with a polarization state of the second light pulse, using a nonlinear effect at the first nonlinear medium; and
outputting the first light pulse from the first nonlinear medium selectively to a first output path or a second output path in accordance with the polarization state controlled by the first nonlinear medium, wherein
a level of the selectively output first light pulse is compensated by receiving energy of the second light pulse by virtue of the nonlinear effect at the first nonlinear medium, and
the outputting the second light pulse comprises:
outputting an optical clock that is substantially in synchronization with the first light pulse;
outputting a polarization-state selecting light having a pulse rise in synchronization with pulse timing for selecting one of the first and second polarization states among clock pulses of the optical clock;
inputting the optical clock and the polarization-state selecting light to a second nonlinear medium; and
outputting an optical clock from the second nonlinear medium as the second light pulse having a clock pulse of one of the first and second polarization states, using a nonlinear effect.

* * * * *